US009226490B2

(12) United States Patent
Keye

(10) Patent No.: US 9,226,490 B2
(45) Date of Patent: Jan. 5, 2016

(54) AGRICULTURAL SPRAYING EQUIPMENT BOOM LEVEL CONTROL SYSTEM

(75) Inventor: Martin Keye, Parkdale (AU)

(73) Assignee: Topcon Precision Agriculture Pty Ltd., Mawson Lakes (AU)

( * ) Notice: Subject to any disclaimer, the term of this patent is extended or adjusted under 35 U.S.C. 154(b) by 133 days.

(21) Appl. No.: 13/111,522

(22) Filed: May 19, 2011

(65) Prior Publication Data

US 2011/0282554 A1 Nov. 17, 2011

Related U.S. Application Data

(63) Continuation of application No. 12/449,555, filed as application No. PCT/AU2008/000175 on Feb. 12, 2008, now abandoned.

(30) Foreign Application Priority Data

Feb. 12, 2007 (AU) ............................... 2007900687

(51) Int. Cl.
*A01M 7/00* (2006.01)

(52) U.S. Cl.
CPC .................................. *A01M 7/0057* (2013.01)

(58) Field of Classification Search
CPC . A01M 7/0057; A01M 7/0014; A01G 25/097
USPC .......... 701/31.4, 49, 50, 408, 468; 239/1, 67, 239/69, 165, 749, 168; 68/12.26
See application file for complete search history.

(56) References Cited

U.S. PATENT DOCUMENTS

| 4,709,857 | A | | 12/1987 | Wilger |
| 4,763,836 | A | * | 8/1988 | Lyle et al. ...................... 239/69 |
| 4,877,189 | A | * | 10/1989 | Williams ...................... 239/749 |
| 5,348,226 | A | * | 9/1994 | Heiniger et al. .................. 239/1 |
| 5,794,852 | A | | 8/1998 | Wald et al. |
| 5,931,882 | A | * | 8/1999 | Fick et al. ...................... 701/50 |
| 5,988,528 | A | * | 11/1999 | Krohn et al. ................... 239/168 |
| 6,010,079 | A | * | 1/2000 | Mayfield et al. .............. 239/165 |
| 6,021,959 | A | * | 2/2000 | Mayfield et al. ................ 239/67 |
| 6,053,419 | A | * | 4/2000 | Krohn et al. ...................... 239/1 |
| 6,230,091 | B1 | * | 5/2001 | McQuinn ........................ 701/50 |
| 6,834,223 | B2 | * | 12/2004 | Strelioff et al. ................. 701/50 |
| 7,150,419 | B1 | | 12/2006 | Tomlonovic et al. |

(Continued)

OTHER PUBLICATIONS

PCT International Search Report from PCT Application No. PCT/AU2008/000175 filed Feb. 12, 2008 (3 pgs).

(Continued)

*Primary Examiner* — Tuan C. To
*Assistant Examiner* — Yuri Kan
(74) *Attorney, Agent, or Firm* — Chiesa Shahinian & Giantomasi PC

(57) ABSTRACT

A system and method for controlling the level of a moveable first wing in a vehicle mounted spray system. The vehicle mounted spray system comprises of the moveable first wing and a moveable second wing mounted to a common support structure to form a pair of opposed independently moveable wings extending laterally from the vehicle. The method and system comprise a first step of determining an initial control signal for the moveable first wing based on a position of the moveable first wing 210, then determining a compensating signal; and then controlling the level of the moveable first wing based on the initial control signal and the compensating signal.

15 Claims, 6 Drawing Sheets

(56) References Cited

U.S. PATENT DOCUMENTS

| | | | | |
|---|---|---|---|---|
| 7,953,550 | B1* | 5/2011 | Weiting | 701/468 |
| 8,185,303 | B1* | 5/2012 | Wieting | 701/408 |
| 2004/0093912 | A1* | 5/2004 | Krieger et al. | 68/12.26 |
| 2004/0158381 | A1* | 8/2004 | Strelioff et al. | 701/50 |
| 2005/0055142 | A1* | 3/2005 | McMurtry et al. | 701/29 |
| 2011/0282554 | A1* | 11/2011 | Keye | 701/49 |

OTHER PUBLICATIONS

PCT Written Opinion from PCT Application No. PCT/AU2008/000175 filed Feb. 12, 2008 (4 pgs).

PCT Preliminary Report on Patentability from PCT Application No. PCT/AU2008/000175 filed Feb. 12, 2008 (3 pgs).

* cited by examiner

AGRICULTURAL SPRAYING EQUIPMENT BOOM LEVEL CONTROL SYSTEM

CROSS REFERENCE TO PRIOR APPLICATION

This is a continuation of application Ser. No. 12/449,555 filed Aug. 12, 2009 which is a U.S. national phase application under 35 U.S.C. §371 of International Patent Application No. PCT/AU2008/000175, filed Feb. 12, 2008, and claims the benefit of Australian Provisional Patent Application No. 2007900687 entitled "LEVEL CONTROL SYSTEM AND METHOD" and filed on 12 Feb. 2007, both of which are hereby incorporated by reference in their entirety. The International Application was published in English on Aug. 21, 2008, as WO 2008/098290 A1 under PCT Article 21(2).

FIELD OF THE INVENTION

The present invention relates to a spraying system for the spraying of agricultural crops and the like. In a particular form, the present invention relates to a vehicle mounted spraying system.

BACKGROUND OF THE INVENTION

Vehicle mounted spraying systems incorporating a boom that extends laterally both sides of a vehicle such as a tractor are commonly used to spray agricultural crops with liquid based products such as fertilisers or other chemicals. Typically, these spraying systems are mounted to the rear of the vehicle which will also carry a tank containing the liquid that is to be sprayed. To ensure that the correct amount of liquid is sprayed, the spraying system is configured so that a given flow rate is dispensed from a plurality of sprayers located along the arm at a predetermined height above the surface to be sprayed. Often these vehicle mounted spraying systems will incorporate a height adjustment capability to allow the overall height of the boom to be adjusted as desired. Booms vary in size, with typical wing tip to wing tip lengths being 90 feet (27 m), 120 feet (37 m) and 150 feet (46 m).

Whilst such a system is adequate over flat country, where the surface to be sprayed is undulating or sloped simple height adjustment of the boom relative to the vehicle is not sufficient as the ground to the right of the vehicle may be elevated with respect the ground surface to the left of the vehicle. Throughout the specification when referring to a side of the vehicle this is defined in accordance with a view taken towards the rear of the vehicle. To overcome this problem, the boom is divided into separate articulated arms or wings each of which are independently adjustable by hydraulic rams which function to raise or lower the booms in accordance with a control signal provided by ultrasonic distance sensors located on each wing. These distance sensors measure the distance between the wing and the ground surface. In this manner, either the left or right wing of the boom may be automatically raised or lowered as required.

However, there are a number of disadvantages with this approach. As the wings extend for relatively large distances (15-25 m) from the vehicle they are mounted to a central rigid support structure which itself is resiliently mounted to the vehicle. This resilient mounting includes a combination of springs, shock absorbers and pendulums so as to absorb severe twisting and movement shocks and provide some mechanical self levelling of the boom (see for example FIG. 1B). This mounting also provides approximately ±10° of travel in the roll direction which functions to absorb the significant stresses that the central support structure would otherwise encounter if it were to be rigidly mounted to the vehicle.

Unfortunately, the effect of this resilient mounting is to greatly reduce the stability of the wing height control as, for example, raising the left wing to compensate for a raised ground profile in this region will in fact cause the right wing to pivot upwardly due to the torque imparted on the entire boom by the redistribution of weight on the left hand side. This will then result in a control signal being sent to the right hand side to lower the right wing, thereby leading to a potential instability. Eventually, the boom will reach equilibrium but only after a delay of approximately one to three seconds during which time the sprayed liquid will not be dispensed in the correct amounts over the ground.

Another significant disadvantage of these prior art vehicle mounted spray systems occurs when the vehicle encounters a local undulation in the surface such as a rock or a rut in the ground that causes the vehicle to rapidly change lateral slope angle. In extreme circumstances, this could cause the tip of a wing to impact the ground as the speed of response of the ultrasonic distance sensors located on the wings is not rapid enough to prevent this occurring. Even in the case where an impact is avoided, the raising of the wing to avoid the impact will cause the raising of the opposed wing as discussed earlier, once again resulting in a time of instability of the spraying system.

What is needed is a vehicle mounted spraying system capable of improved stability control.

SUMMARY OF THE INVENTION

A first embodiment of the present invention provides a method for controlling the level of a moveable first wing in a vehicle mounted spray system that comprises the moveable first wing and a moveable second wing mounted to a common support structure to form a pair of opposed independently moveable wings extending laterally from the vehicle, the method comprising:

a) determining an initial control signal for the moveable first wing based on a position of the moveable first wing;

b) determining a compensating signal for the initial control signal wherein the compensating signal includes a component dependent upon a measurement by a sensor not located on the first wing; and c) controlling a level of the moveable first wing based on the initial control signal and the compensating signal.

A second embodiment of the present invention provides a method for controlling the level of a moveable first wing and a moveable second wing in a vehicle mounted spray system that comprises the moveable first wing and the moveable second wing mounted to a common support structure to form a pair of opposed independently moveable wings extending laterally from the vehicle, the method comprising:

a) determining initial control signals for each moveable wing based on the respective positions of each moveable wing;

b) determining respective compensating signals for each moveable wing wherein the respective compensating signal for each moveable wing includes a component dependent upon a measurement by a sensor not located on the respective wing, and compensates the initial control signal of the respective moveable wing; and c) controlling the level of each moveable wing based on the respective initial control signals and the respective compensating signals.

A third embodiment of the present invention provides a system for controlling the level of a moveable first wing in a vehicle mounted spray system that comprises the moveable first wing and a moveable second wing mounted to a common support structure to form a pair of opposed independently moveable wings extending laterally from the vehicle, the system comprising:

a) means for determining an initial control signal for the moveable first wing based on a position of the moveable first wing;

b) means for determining a compensating signal for the initial control signal wherein the compensating signal includes a component dependent upon a measurement by a sensor not located on the first wing; and c) means for controlling a level of the moveable first wing based on the initial control signal and the compensating signal.

A fourth embodiment of the present invention provides a system for controlling the level of a moveable first wing and a moveable second wing in a vehicle mounted spray system that comprises the moveable first wing and the moveable second wing mounted to a common support structure to form a pair of opposed independently moveable wings extending laterally from the vehicle, the system comprising:

a) means for determining initial control signals for each moveable wing based on the respective positions of each moveable wing;

b) means for determining respective compensating signals for each moveable wing wherein the respective compensating signal for each moveable wing includes a component dependent upon a measurement by a sensor not located on the respective wing, and compensates the initial control signal of the respective moveable wing; and c) means for controlling the level of each moveable wing based on the respective initial control signals and the respective compensating signals.

BRIEF DESCRIPTION OF THE DRAWINGS

Illustrative embodiments of the present invention will be discussed with reference to the accompanying drawings wherein.

DESCRIPTION OF ILLUSTRATIVE EMBODIMENT

The drawings in the present application and their accompanying detailed description are directed to merely example embodiments of the invention. To maintain brevity, other embodiments of the invention which use the principles of the invention are not specifically described in the present application and are not specifically illustrated by the present drawings.

The word "exemplary" is used exclusively herein to mean "serving as an example, instance or illustration." Any embodiment described herein as "exemplary" is not necessarily to be construed as preferred or advantageous over other embodiments.

Before describing the control method in detail, it is convenient to describe a vehicle mounted spraying system.

Figure 1A:
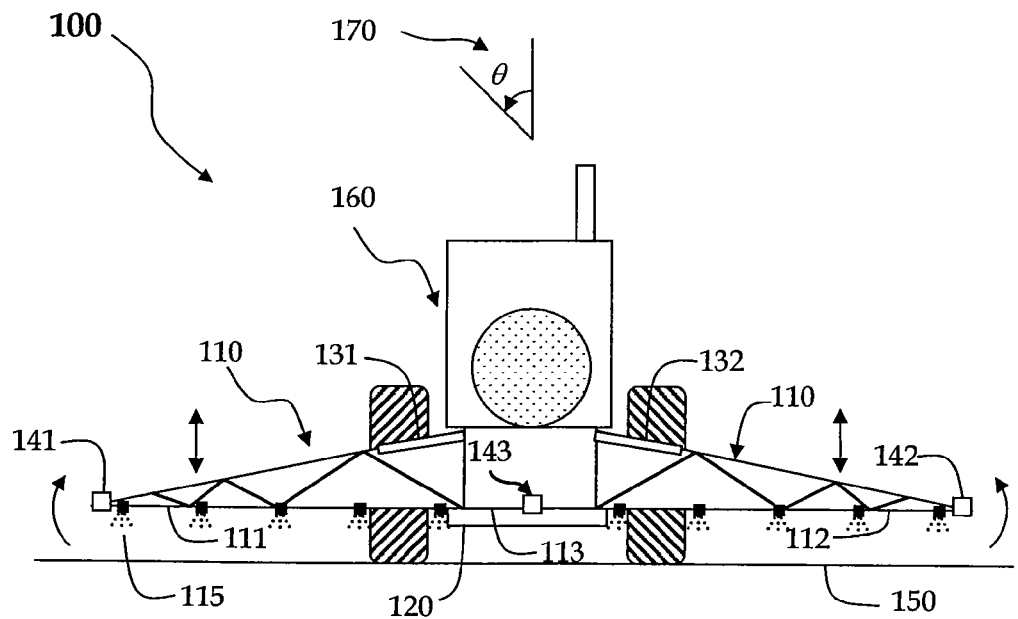
FIG. 1A is a rear elevational view of a vehicle mounted spraying system according to an exemplary embodiment of the present invention.
Figure 1B:
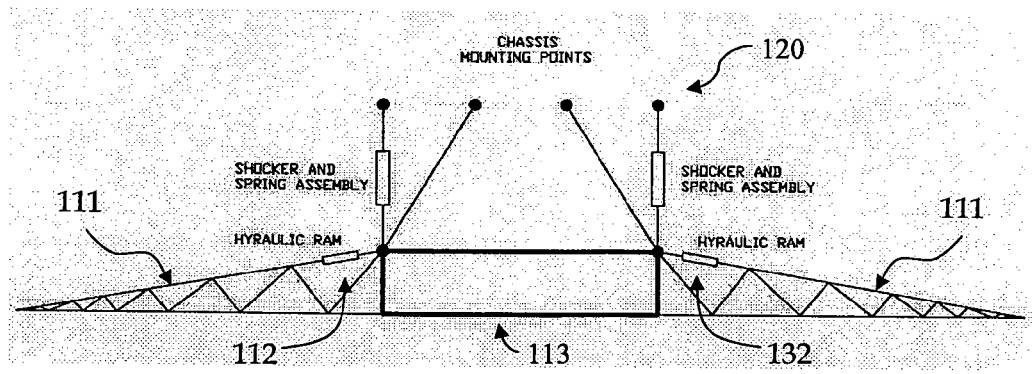
FIG. 1B is a representation of the resilient mounting arrangement for the boom section.

Referring now to FIG. 1A, there is shown a vehicle mounted spraying system 100 in accordance with an illustrative embodiment of the present invention. Vehicle mounted spraying system 100 is mounted to a vehicle 160 which in this case is a tractor and includes a boom section 110 incorporating a pair of opposed wing sections 111, 112 mounted to a central support structure 113 which in turn is mounted to vehicle 160 by a resilient mounting arrangement 120 as is known in the art. An alternative view of boom section 110 and resilient mounting arrangement 120 is presented in FIG. 1B.

Figure 1C:
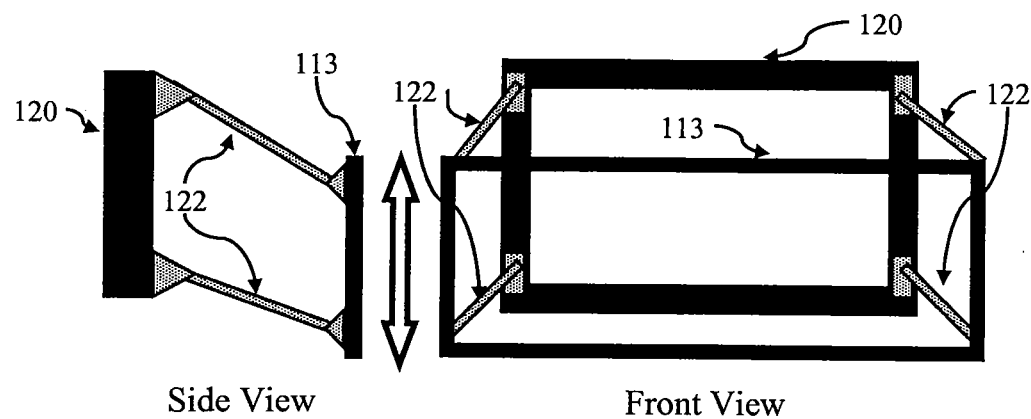
FIG. 1C is a representation of a raising means using a parallelogram mechanical method.
Figure 1D:
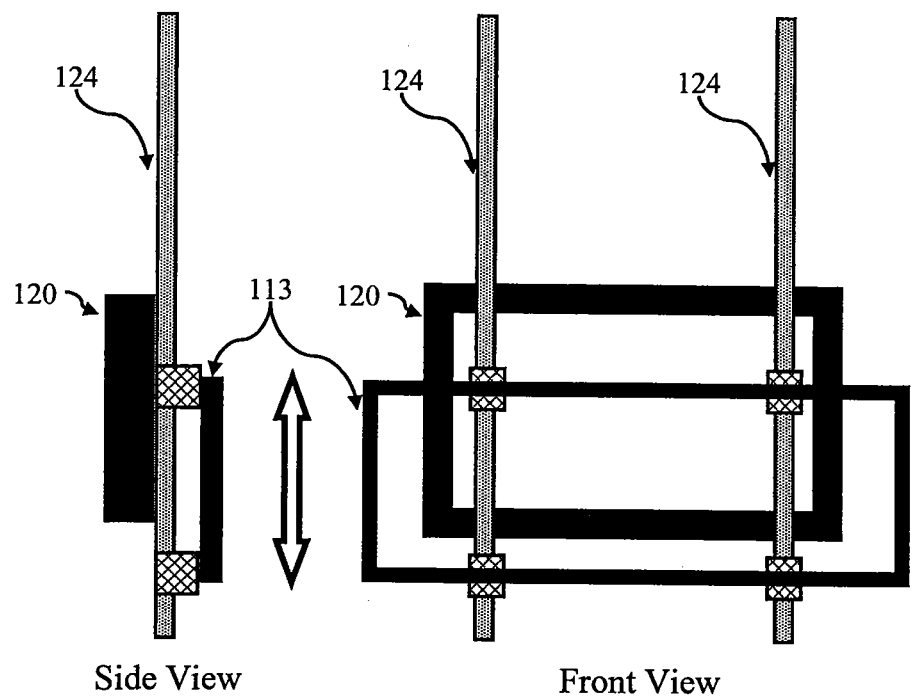
FIG. 1D is a representation of a raising means using two vertical guide tracks.

Referring now to FIGS. 1C and 1D, the boom section 110 includes a raising means, which allows the entire boom 110 to be raised to a predetermined height with respect to the tractor 160 whilst ensuring that spray nozzles 115 continue to point in a downward direction. The raising means utilizes hydraulic rams and may be via a parallelogram mechanical method as shown in FIG. 1C where the central support structure 113 is raised by a series of parallel linkage arms 122 extending rearward and downwardly from the resilient mounting arrangement 120. Alternatively the raising means may be through the use of two vertically mounted guide tracks 124 as shown in FIG. 1D.

Each wing 111, 112 may be separately articulated by a corresponding hydraulic ram 131, 132 which function to separately raise and lower each wing 111, 112 in accordance with control signals provided by a hydraulic control system (not shown). Distance sensors 141, 142 are mounted at the tips of each wing 111, 112 and measure the positions or heights of the tips of each wing 111, 112. Alternatively one or more distance sensors may be mounted at other locations along a wing to provide position or height information at their respective position. A distance sensor 143 is also mounted on the support structure 113. These sensors allow the difference in the height of the wing tip relative to the centre of the support structure to be calculated (i.e. the wing height error).

A control method 200 for controlling the level of a moveable first wing in a vehicle mounted spray system according to an exemplary embodiment of the present invention will now be described. The general aim of the wing control system is to keep the wing tips at the same height as the center of boom 110 which is set by the operator (see also FIGS. 1C and 1D). In this manner, wings 111, 112 will appear to be generally parallel to or level with the ground. In the following discussion, the wings will sometimes be referred to as the first wing and the second wing. In this terminology first refers to the wing to be controlled and the second wing corresponds to the opposite wing. Thus if the first wing is the left wing then the second wing is the right wing and if the first wing is the right wing then the second wing is the left wing.

Figure 2:
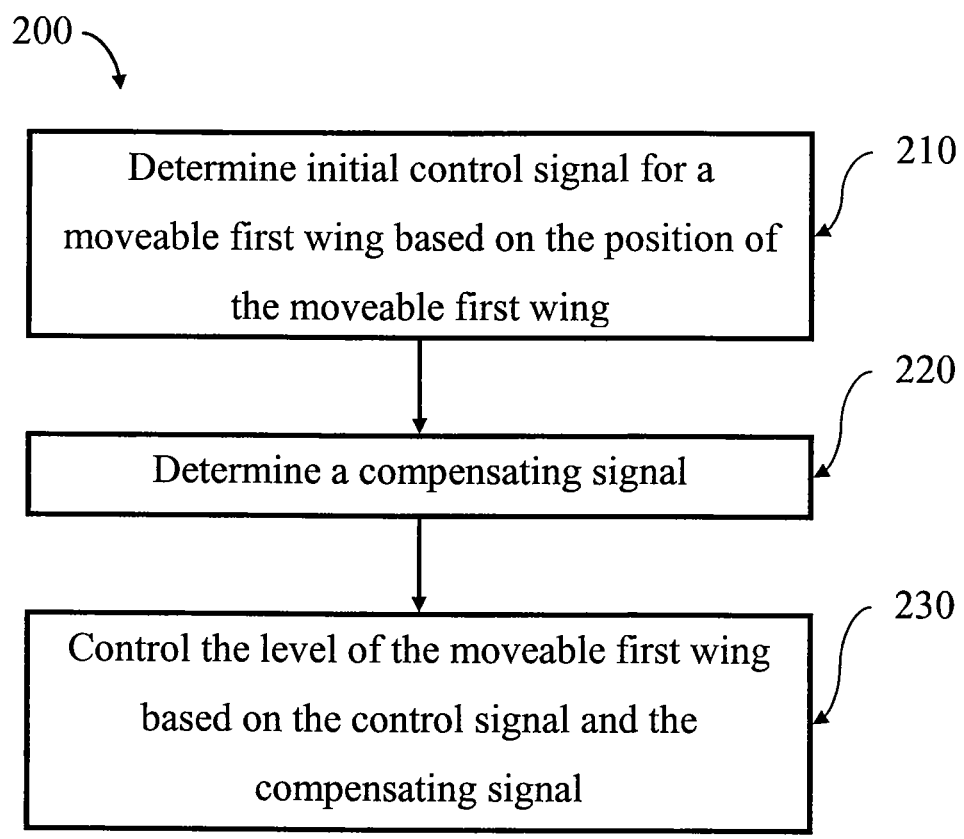
FIG. 2 is a flow chart of a method for controlling a wing according to an exemplary embodiment of the invention.

Referring to FIG. 2, there is shown a flowchart of a control method 200 for controlling the level of a moveable first wing in a vehicle mounted spray system in accordance with an exemplary embodiment of the present invention. The control method 200 begins with the estimation of an initial control signal for the moveable first wing based on the position of the moveable first wing 210. Typically level control systems utilize pulse width modulation (PWM) controllers wherein a pulse width modulation (PWM) signal is employed to drive hydraulic control solenoids installed for each hydraulic ram 131,132. A PWM control signal varies from a minimum of zero to a maximum of 100 in either a lift or lower direction. A higher value for the control signal implies a more rapid change in position of the corresponding wing (e.g. 111). However as would be apparent to those skilled in the art, other alternatives to PWM controllers may be used to generate the primary control signal based on the position of the wing. For example a proportional-integral-derivative (PID) controller could be used rather than a PWM controller, or a combination of the two could be used.

Figure 3:
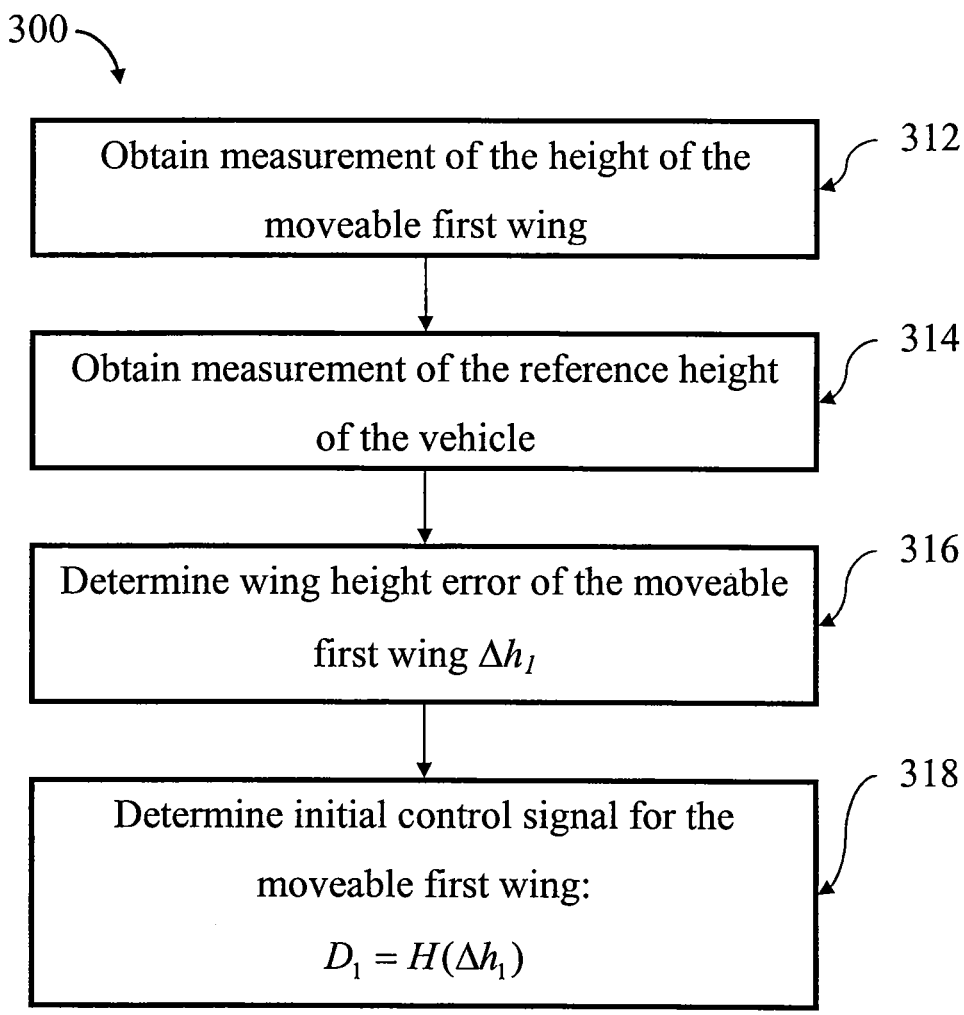
FIG. 3 is a flowchart of expanded step 210 of FIG. 2 for estimating a control signal.

Referring to FIG. 3, an exemplary embodiment of a method 300 for the estimation of an initial control signal for the moveable first wing based on the position of the moveable first wing is presented. At step 312 a measurement of the height of the moveable first wing with respect to the ground is obtained and at step 314 a measurement of the reference height of the vehicle is obtained. Typically distance sensors 141,142,143 employ ultrasonic ranging to measure the height of the sensor above the surface being sprayed. For example ultrasonic sensors in the MA40 series produced by the Murata Manufacturing Company may be used. However ultrasonic sensors produced by other companies or alternative technologies may be used to measure heights or positions such as laser or optical range finders, LIght or RAdio Detection And Ranging (LIDAR or RADAR) systems, interferometry based systems or other radio frequency based systems (eg GPS). As an example, a tag could be placed on the wing tips and vehicle body and a remote measuring device used to measure the position or heights of the tags and this information could then be provided to the control system.

In the above exemplary embodiment, ultrasonic distance sensors are placed near each wing tip for wing height measurements, and on the support structure 113 for measurements of the reference height. In an alternative embodiment, two or more distance sensors are mounted on support structure 113 to increase the reliability of the reference height measurement. As described earlier multiple distance sensors could be located on a wing and these can also be averaged or otherwise combined to improve the estimate of the respective wing height.

At step 316 a wing height error M, of the moveable first wing is obtained. The wing height controller determines the wing height error as the difference between the wing height measured in step 312 by a sensor located near the wing tip, and the reference height measured by a sensor located on support structure 113 in step 314 (where the height of the support structure is set by operator using the raising means). In an alternative embodiment, the reference height may be different to the height measured by vehicle sensor, for example if the vehicle sensor is not located on the centre of the boom but elsewhere on the vehicle or support structure. In this case the controller may add an offset to the vehicle sensor measurement to obtain an estimate of the reference height so as to calculate the wing height error.

In another alternative embodiment, the desired position of the boom may be provided to the controller and the wing height error is then the difference between the measured position and the desired position. In yet another alternative embodiment, where multiple position sensors are placed at known lateral positions on the wing (when horizontal), a series of height measurements could be obtained to determine the wing angle with respect to the horizontal, and simple trigonometry used to determine the wing height error of the wing tip based on the wing angle and known wing length.

If the wing height error determined in step 316 is not zero, then at step 318 an initial control signal $D_1$ is generated to actuate the associated hydraulic ram 131, 132 to bring the wing back to a level orientation. As described previously a pulse width modulation (PWM) signal is typically employed whose value varies from a minimum of zero to a maximum of 100 in either a lift or lower direction. A higher value for the control signal implies a more rapid change in position of the corresponding wing (e.g. 111).

The control algorithm for the left and right wings can be represented as:

$$D_L = H(\Delta h_L) \quad (1)$$

$$D_R = H(\Delta h_R) \quad (2)$$

where $D_L$ or $D_R$ are the left and right control signals, $\Delta h_L$ and $\Delta h_R$ are the wing height errors for the left and right wings respectively and $H(\Delta h_i)$ is defined as an arbitrary controller function dependent on the wing height error of wing i, $\Delta h_i$ (where the subscript i denotes left or right), which depends upon the wing position. A suitable controller function for use with PWM controllers is one in which the control signal is a proportion of the measured wing height error. This function may be represented by the following controller equations:

$$H(\Delta h_L) = \Delta h_L \times G \quad (3)$$

$$H(\Delta h_R) = \Delta h_R \times G \quad (4)$$

where G is a constant termed the proportional gain which is the same for each wing. In an alternative embodiment, wing specific proportional gain constants $G_i$ could be used.

As has been referred to earlier, this changing of the height of a single wing often results in a corresponding action in the opposed wing, thereby causing instability in the control system. For example, operation of the hydraulic ram 131 in accordance with a left wing PWM control signal $D_L$ to raise the left wing 111 will cause right wing 112 to raise as the boom 110 rotates generally counter clockwise on resilient mounting 120, thereby changing $\Delta h_R$ and resulting in an increase in right wing PWM control signal $D_R$ to lower right wing 112. Without further adjustment or compensation of the signal the operator must stop or disengage the system in order to regain control. Also without further adjustment or compensation of the signal the operator must carefully monitor their speed in order to maintain control and prevent the development of instability in the spraying system, although even moving at slow speed is not necessarily sufficient to stop such an instability developing.

Referring back to FIG. 2, the control method 200 in accordance with an embodiment of the present invention proceeds with an estimation of a compensating signal 220 and then at step 230 the level of the moveable first wing is controlled based on the initial control signal and the compensating signal. The compensating signal 220 may be determined in various ways. In one exemplary embodiment, the compensating signal for the first wing is based on the position of the moveable second wing. In another embodiment, the compensating signal is based on the time delayed control signal sent to the opposite wing (which may depend upon the position of the moveable second wing). In yet another embodiment the compensating signal depends upon a roll measure such as the roll angle or roll rate of the vehicle. In still yet another embodiment, the compensating signal is a combination of two or more of the functions.

In accordance with an embodiment of the present invention, controller equations 1 and 2 may be further generalised to include arbitrary compensation functions $K_L(D_R)$ and $K_R(D_L)$ which are based on the opposite wing control signals $D_R$ and $D_L$:

$$D_L = H(\Delta h_L) + K_L(D_R) \quad (5)$$

$$D_R = H(\Delta h_R) + K_R(D_L) \quad (6)$$

In one exemplary embodiment, the compensating signal is determined as a proportion of the time delayed PWM control signal sent to the opposite wing which is directly related to the position of the wing of the opposite side. This compensating signal is then added to the initial PWM control signal in order to control the level of the first wing. By artificially adding a time delayed proportion from the drive of one side to the drive of the opposite side the sympathetic movement of the opposite wing is compensated for.

The controller equations in this case are:

$$D_L = \Delta h_L \times G + \overline{D}_R \times C \quad (7)$$

$$D_R = \Delta h_R \times G + \overline{D}_L \times C \quad (8)$$

where $\overline{D}_R$ is the time delayed PWM control signal of $D_R$ (which depends on the position of right wing), $\overline{D}_L$ is the time delayed PWM control signal of $D_L$ (which depends upon the position of the left wing) and C is a constant of proportionality. In an alternative embodiment, wing specific constants $C_i$ could be used, with or without wing specific proportional gain constants $G_i$. In an alternative embodiment, the time delayed signal used to compensate the control signal for the first wing is the initial (uncompensated) control signal determined for the second wing (eg $\Delta h_2 \times G$ rather than $D_2$).

This approach of using a compensating signal provides a significant advantage over prior art control systems. As an example, suppose the left wing 111 is too low to the ground 150. The control system will typically generate a left wing control signal to apply a lifting action to level the left wing 111. This lifting action will also cause the vehicle to roll to the left in response and thereby cause the right wing to lift in a delayed proportion. Without incorporating a compensating signal, the controller will sense the lifting of the right wing 112 and generate a right wing control signal to activate a lowering movement. By adding a proportion of the left lifting control signal to the right control signal output the lowering signal ordinarily given by the controller is cancelled, thereby allowing the boom 110 to stabilize rapidly.

The applicant has found that the control method set out in equations 7 and 8 provide a significant advantage in stabilizing the boom control when compared to prior art systems. In use, the operator is presented with three parameters for tuning the control system these being the time delay, the proportional gain G, and constant of proportionality C. Testing with over 10 different booms has indicated that the choice of the time delay is not particularly sensitive to the choice of boom with suitable values being between about 0.4 and 0.6 seconds. Similarly a proportional gain G of 0.25 has been found to be suitable for all booms tested. A value of 1.5 has been found to be suitable for the constant of proportionality C.

Precomputed values for the time delay and constant of proportionality for a range of boom arrangements (e.g. different lengths, masses etc) may be programmed into a controller for selection by the user based on the boom in use. Alternatively, the controller could include a learning mode which attempts to learn suitable values of the time delay, proportional gain and constant of proportionality. For example, the controller could perform an operation to raise one boom and observe the time taken for both booms to stabilize at the desired heights. This operation could then be repeated for various values of the time delays and constant of proportionality. After a series of test operations the optimum values could then be stored and used.

Figure 4:
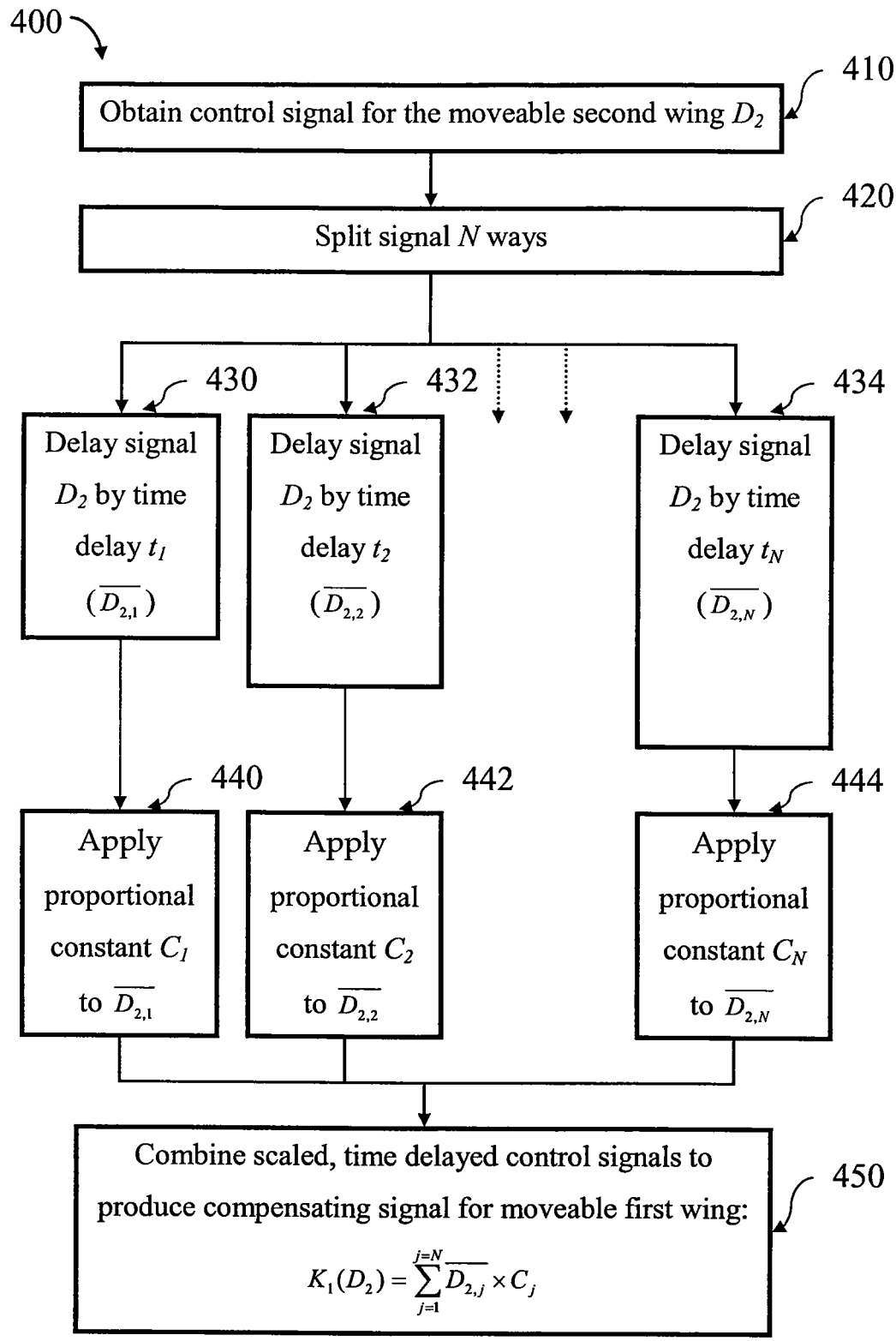
FIG. 4 is a flowchart of expanded step 220 of FIG. 2 of a method for estimating a compensating signal.

The control method in accordance with the present invention may be further extended by using a compensating signal comprised of multiple time delayed control signals, where each control signal is delayed by a different amount, and different values of proportional constants are used. A method 400 for producing such a compensating signal is illustrated in FIG. 4. At step 410 a control signal for the moveable second wing is obtained. At step 420 this signal is split N ways, where N is the number of delayed signals to be used in determining the compensating signal. Each signal is then delayed by a different amount denoted by $t_j$ where j=1 to N (430, 432, 434). A proportional constant $C_i$ (scaling factor) is then applied to each delayed signal, 440, 442, 444 (i.e. different time delays have different scaling factors). Dotted lines are used to represent signals 3 to N−1, wherein the delay and scaling steps are not shown. At step 450 the N time delayed and scaled signals are combined to produce a compensating signal for the moveable first wing which may be represented by the following equation:

$$K_1(D_2) = \sum_{j=1}^{j=N} \overline{D_{2,j}} \times C_j \quad (9)$$

The value of N can be predetermined and may be set to 1 (as in equation 7) or larger. For example in the case that N=3, the controller equations would be:

$$D_L = \Delta h_L \times G + \overline{D}_R \times C_1 + \overline{\overline{D}}_R \times C_2 + \overline{\overline{\overline{D}}}_R \times C_3 \quad (10)$$

$$D_R = \Delta h_R \times G + \overline{D}_L \times C_1 + \overline{\overline{D}}_L \times C_2 + \overline{\overline{\overline{D}}}_L \times C_3 \quad (11)$$

where $\overline{D}_R$, $\overline{\overline{D}}_R$, and $$\overline{\overline{\overline{D}}}_R$$

represent successive adjustable time delayed control signals $D_R$ (and similarly for the left wing signals) and $C_1$, $C_2$, and $C_3$ are individual proportional constants.

As in the case that N=1, precomputed constants could be used, or they could be determined using a learning mode. Each time delay will be of a different length, and the effect of the corresponding proportional constant $C_j$ is to scale the magnitude of the delayed signal (as using the same delay with two different proportional constants is equivalent to a signal using the same delay with a proportional constant which is the sum of the two proportional constants). The use of multiple delays may then be used to compensate for or damp out multiple resonant frequencies or modes in the vehicle mounted spray system.

As would be apparent to those skilled in the art, one of the disadvantages of using ultrasonic distance sensors 141, 142 is the inherent delay involved in obtaining measurements due to the speed of sound. This becomes particularly noticeable where boom 110 is tilting over due to the wheels of vehicle 160 going into a rut or alternatively going over a bump. In extreme cases, a large rut or bump can cause the boom tips to strike the ground which is potentially damaging to the boom and thus highly undesirable.

In a further illustrative embodiment of the present invention, a roll measure $\theta_M$ is obtained and utilized in determining the compensating signal 220. Suitable roll measures include the roll angle of the vehicle, $\theta$, (170), or the roll rate of the vehicle, $\dot{\theta}$. Controller equations 5 and 6 may then be modified to replace arbitrary compensation functions $K(D_R)$ and $K(D_L)$ based on $D_R$ and $D_L$ with arbitrary compensation functions $K_L(\theta_M)$ and $K_R(\theta_M)$ based on roll measure $\theta_M$:

$$D_L = H(\Delta h_L) + K_L(\theta_M) \tag{12}$$

$$D_R = H(\Delta h_R) + K_R(\theta_M) \tag{13}$$

In one exemplary embodiment, a gyroscope sensor such as the Murata ENV-05G may be employed to sense and measure the roll rate $\dot{\theta}$ of vehicle 160. An important advantage of a gyroscope sensor is that $\dot{\theta}$ can be measured almost instantaneously and a compensating signal then determined rapidly, thereby anticipating the control movement that will be required and moving one or more wings more rapidly when compared to a response based on ultrasonic measurements as described previously.

In this embodiment, compensation functions based on the roll rate, $\dot{\theta}$ may be defined as:

$$K_L(\theta_M) = +\dot{\theta} \times R \tag{14}$$

$$K_R(\theta_M) = -\dot{\theta} \times R \tag{15}$$

where R is the roll rate constant of proportionality that determines the strength of the compensation. The sign of the compensation is applied in an opposite sense between left and right sides due to the vehicle rolling having an equal and opposite effect on the left and right wings 111, 112. Controller equations (12) and (13) may thus be specified as:

$$D_L = \Delta h_L \times G + \dot{\theta} \times R \tag{16}$$

$$D_R = \Delta h_R \times G - \dot{\theta} \times R \tag{17}$$

In this manner, the wing level is controlled based on an initial control signal which is based on the wing height error (i.e. position) and a compensating signal which depends upon the vehicle roll angle.

In a further illustrative embodiment of the present invention, a compensating signal 220 based on both the roll measure and on the position of the opposed wing may be employed. In this embodiment the left ($K_L$) and right ($K_R$) compensating signals may be defined as:

$$K_L(D_R, \theta_M) = K(D_R) + K_L(\theta_M) \tag{18}$$

$$K_R(D_L, \theta_M) = K(D_L) + K_R(\theta_M) \tag{19}$$

leading to controller equations:

$$D_L = H(\Delta h_L) + K_L(D_R, \theta_M) = \Delta h_L \times G + \overline{D}_R \times C + \dot{\theta} \times R \tag{20}$$

$$D_R = H(\Delta h_R) + K_R(D_L, \theta_M) = \Delta h_R \times G + \overline{D}_L \times C - \dot{\theta} \times R \tag{21}$$

Figure 5:
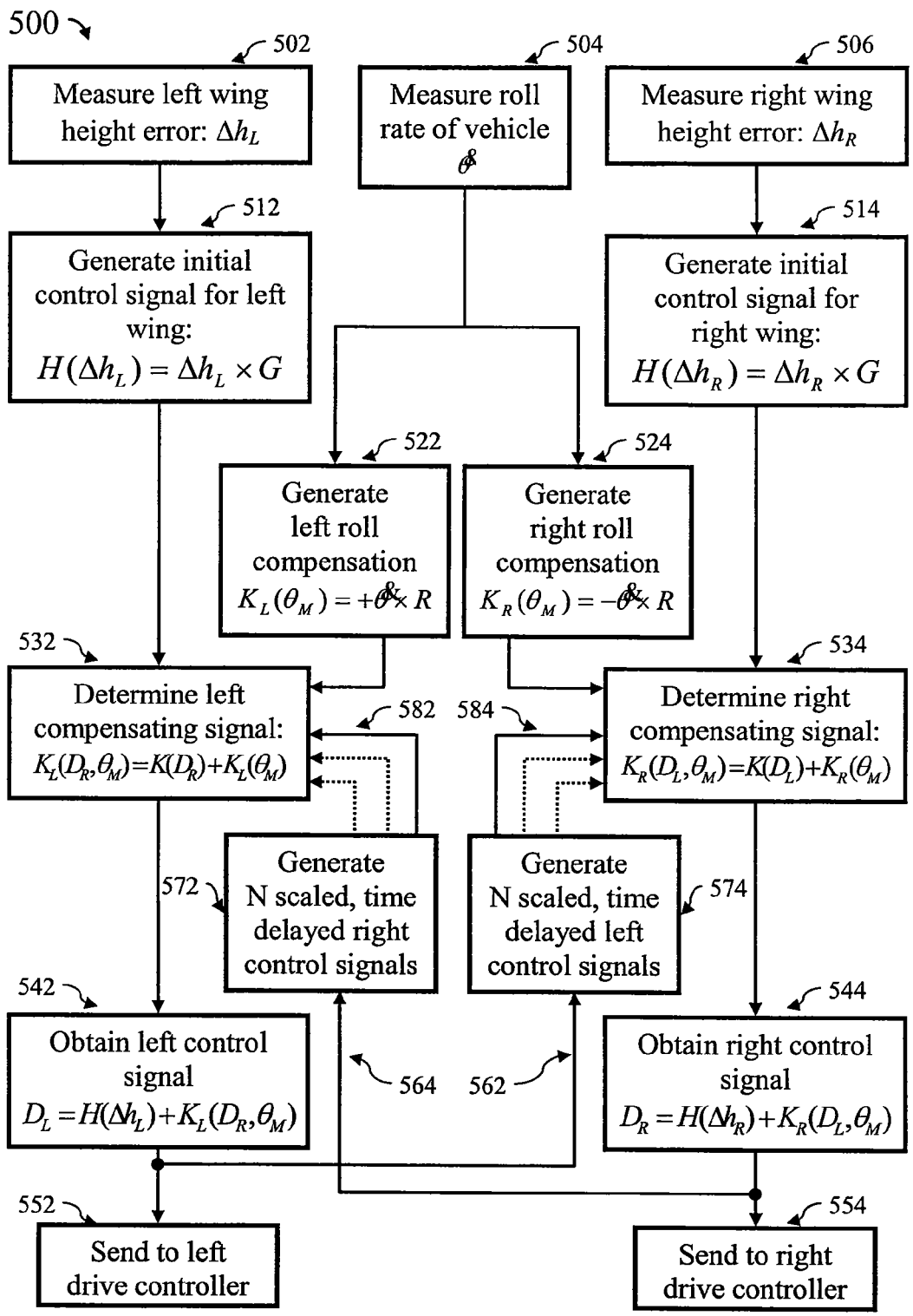
FIG. 5 is a flow chart of an exemplary embodiment of the invention for controlling both wings where the compensating signal for a wing uses both a roll measure and a time delayed control signal for the opposing wing.

FIG. 5 illustrates a general control procedure 500 for two wings for the case that the compensating signal is based on N time delayed signals and a roll rate measurement. Wing height errors of the left and right wings are determined at steps 502 and 506 respectively. At step 504 the roll rate of the vehicle is measured. Left and right initial control signals are then determined based upon the wing height errors at 512 and 514 according to equations 1 and 2. At steps 532 and 534 left and right compensating signals are determined which also employ roll compensating signals which are determined at steps 522 and 524 according to equations 18 and 19 (note different signs for left and right signals). In this embodiment the compensating signals also include the scaled time delayed control signals of the opposite wing as shown at 564, 572, 582, and 562, 574, 584. Dotted lines are used to represent N scaled time delayed control signals which may be used in determining the compensating signal. Left and right control signals are then obtained at steps 542 and 544 (542 from 512 and 532 and 544 from 514 and 534) by adding the initially generated control signal and the compensating signal according to equations 20 and 21. These left and right control signals are split with one signal sent to the drive controller for the respective wing 552, 554, and the other signal used to generate time delayed signals for the opposite wing, 562, 564.

A brief consideration of the above described embodiments will indicate that the invention provides an extremely effective control system for a vehicle mounted spray system which is effective to significantly improve the stability of the control system by taking into account additional factors besides the height of a given wing.

The techniques described herein for controlling the wing level may be implemented by various means. For example, these techniques may be implemented in hardware, software, or a combination thereof. For a hardware implementation, the processing of measured heights or positions, time delaying of control signals and estimation of control and compensating signals may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In one embodiment, ultrasonic sensors obtained from Murata Manufacturing Co. Ltd. were used for height measurements and a dsPIC30F6010A microprocessor from Microchip Technology Inc. was used to implement the control methods and generate the PWM control signals.

For a software implementation, the techniques described herein may be implemented with modules (e.g., procedures, functions, and so on) that perform the functions described herein. The software codes may be stored in a memory unit and executed by a processor. The memory unit may be implemented within the processor or external to the processor, in which case it can be communicatively coupled to the processor via various means as is known in the art.

Although illustrative embodiments of the present invention have been described in the foregoing detailed description, it will be understood that the invention is not limited to the embodiments disclosed, but is capable of numerous rearrangements, modifications and substitutions without departing from the scope of the invention as set forth and defined by the following claims.

The invention claimed is:

1. A method for controlling the level of a moveable first wing in a vehicle mounted spray system that comprises the moveable first wing and a moveable second wing mounted to a common support structure to form a pair of opposed independently moveable wings extending laterally from the vehicle, the method comprising:
   a) determining an initial control signal to move the moveable first wing independent of the moveable second wing based on a position of the moveable first wing;
   b) determining a compensating signal for the initial control signal wherein the compensating signal is derived independent from the moveable first wing and includes a component dependent upon a position of the moveable second wing and a time delayed control signal output to the moveable second wing; and c) controlling a level of the moveable first wing independent of the moveable second wing by combining the initial control signal and the compensating signal, wherein the position of the moveable second wing is defined as a first wing height error, the first wing height error being a difference between a height of the moveable second wing with respect to the ground and a reference height, and the time delayed control signal output to the movable second wing is based on the first wing height error.

2. A method as claimed in claim 1, wherein the component is of the form $$K_1(D_2) = \sum_{j=1}^{j=N} \overline{D_{2,j}} \times C_j,$$

where $D_2$ is the control signal output to the moveable second wing, $\overline{D_{2,j}}$ is a time delayed control signal for the moveable i second wing for a time delay $t_j$, $C_j$ is the jth constant of proportionality and N is the number of time delayed control signals to be combined.

3. A method as claimed in claim 2, wherein the time delay $t_1$ is between 0.4 and 0.6 seconds.

4. A method as claimed in claim 2, wherein N is 1.

5. A method as claimed in claim 1, wherein the compensating signal further includes a component dependent upon a roll measure of the vehicle.

6. A method as claimed in claim 5, wherein the roll measure is a roll rate of the vehicle $\dot{\theta}$.

7. A method as claimed in claim 6, wherein the component dependent upon a roll measure of the vehicle is of the form $K_1(\dot{\theta})=\dot{\theta} \times R$ where R is a roll rate constant of proportionality.

8. A method as claimed in claim 1, wherein the position of the moveable first wing is defined as a second wing height error, the second wing height error being a difference between a height of the first wing with respect to the ground and a reference height.

9. A method as claimed in claim 8, wherein the initial control signal for the moveable first wing includes a component $H_1(\Delta h_1)=\Delta h_1 \times G$, where $\Delta h_1$ is the second wing height error, and G is a constant termed the proportional gain.

10. A method for controlling the level of a moveable first wing and a moveable second wing in a vehicle mounted spray system that comprises the moveable first wing and the moveable second wing mounted to a common support structure to form a pair of opposed independently moveable wings extending laterally from the vehicle, the method comprising:

a) determining initial control signals to move each moveable wing independent of the other moveable wing based on the respective positions of each moveable wing;

b) determining respective compensating signals for each moveable wing wherein the respective compensating signal for each moveable wing is derived independent from the respective moveable wing and includes a component dependent upon the position of the other moveable wing and a time delayed control signal output to the other moveable wing, and compensates the initial control signal of the respective moveable wing, wherein the position of the other moveable wing is defined as a wing height error of the other moveable wing, the wing height error of the other movable wing being a difference between a height of the other moveable wing and a reference height, and the time delayed control signal output to the other moveable wing is based on the wing height error of the other moveable wing; and c) controlling the level of each moveable wing independent of the other moveable wing by combining the respective initial control signals and the respective compensating signals.

11. A method as claimed in claim 10, wherein the respective compensating signal for each wing further includes a component dependent upon a roll measure of the vehicle.

12. A method as claimed in claim 11, wherein the roll measure is the roll rate of the vehicle $\dot{\theta}$.

13. A method as claimed in claim 12, wherein a component for the first moveable wing is of the form $K_1(\dot{\theta})=\dot{\theta}\times R$ and a component for the second moveable wing is of the form $K_2(\dot{\theta})=\dot{\theta}\times R$, where R is the roll rate constant of proportionality.

14. A system for controlling the level of a moveable first wing in a vehicle mounted spray system that comprises the moveable first wing and a moveable second wing mounted to a common support structure to form a pair of opposed independently moveable wings extending laterally from the vehicle, the system comprising:

a) means for determining an initial control signal to move the moveable first wing independent of the moveable second wing based on a position of the moveable first wing;

b) means for determining a compensating signal for the initial control signal wherein the compensating signal is derived independent from the moveable first wing and includes a component dependent upon a position of the moveable second wing and a time delayed control signal output to the moveable second wing; and c) means for controlling a level of the moveable first wing independent of the moveable second wing by combining the initial control signal and the compensating signal, wherein the position of the moveable second wing is defined as a first wing height error, the first wing height error being a difference between a height of the second wing with respect to the ground and a reference height, and the time delayed control signal output to the movable second wing is based on the first wing height error.

15. A system for controlling the level of a moveable first wing and a moveable second wing in a vehicle mounted spray system that comprises the moveable first wing and the moveable second wing mounted to a common support structure to form a pair of opposed independently moveable wings extending laterally from the vehicle, the system comprising:

a) means for determining initial control signals to move each moveable wing independent of the other moveable wing based on the respective positions of each moveable wing;

b) means for determining respective compensating signals for each moveable wing wherein the respective compensating signal for each moveable wing is derived independent from the respective moveable wing and includes a component dependent upon the position of the other moveable wing and a time delayed control signal output to the other moveable wing, and compensates the initial control signal of the respective moveable wing, wherein the position of the other moveable wing is defined as a wing height error of the other moveable wing, the wing height error of the other movable wing being a difference between a height of the other moveable wing and a reference height, and the time delayed control signal output to the other moveable wing based on the wing height error of the other moveable wing; and c) means for controlling the level of each moveable wing independent of the other moveable wing by combining the respective initial control signals and the respective compensating signals.

\* \* \* \* \*

UNITED STATES PATENT AND TRADEMARK OFFICE
CERTIFICATE OF CORRECTION

PATENT NO.        : 9,226,490 B2
APPLICATION NO.   : 13/111522
DATED             : January 5, 2016
INVENTOR(S)       : Martin Keye It is certified that error appears in the above-identified patent and that said Letters Patent is hereby corrected as shown below:

Specification

Column 5, lines 46, "At step 316 a wing height error M"

should read --At step 316 a wing height error $\Delta h_i$--

Signed and Sealed this
Tenth Day of May, 2016

Michelle K. Lee
*Director of the United States Patent and Trademark Office*